United States Patent [19]
Invernizzi et al.

[11] Patent Number: 4,481,342
[45] Date of Patent: Nov. 6, 1984

[54] METHOD OF PREPARING LOW-DENSITY ETHYLENE COPOLYMERS

[75] Inventors: Renzo Invernizzi, Milan; Ferdinando Ligorati, Usmate, both, Italy

[73] Assignee: Anic S.p.A., Palermo, Italy

[21] Appl. No.: 498,370

[22] Filed: May 26, 1983

[30] Foreign Application Priority Data

Jun. 10, 1982 [IT] Italy .............................. 21805 A/82

[51] Int. Cl.$^3$ ........................ C08F 4/02; C08F 210/02
[52] U.S. Cl. .................................... 526/125; 502/134; 526/348.2; 526/348.6
[58] Field of Search ......................................... 526/125

[56] References Cited

U.S. PATENT DOCUMENTS

| | | | |
|---|---|---|---|
| 3,953,414 | 4/1976 | Galli et al. | 526/125 |
| 4,293,673 | 10/1981 | Hamer et al. | 526/125 |
| 4,298,713 | 11/1981 | Morita et al. | 526/348.6 |
| 4,347,162 | 8/1982 | Ivernizzi et al. | 526/125 |

*Primary Examiner*—Edward J. Smith
*Attorney, Agent, or Firm*—Sughrue, Mion, Zinn, Macpeak & Seas

[57] ABSTRACT

Method for the copolymerization of ethylene with $C_4$–$C_8$ alpha-olefins by means of a suspension method in an organic liquid, at a temperature of from 50° C. to 70° C., at a pressure of less than about 10 bar, on a Ziegler catalyst constituted by:

(a) an alkylaluminum or alkylaluminum halide;
(b) the product of the reaction of a halogenated derivative of titanium with a support material; the support material being the solid, spheroidal product of the spray drying of a solution of magnesium chloride in ethanol containing at least one additional compound chosen from the following classes:

aliphatic, cycloaliphatic or aromatic liquid hydrocarbons with a boiling point higher than that of ethanol at atmospheric pressure;

polar, organic hydroxy or ester compounds which are solid or liquid with a boiling point higher than that of ethanol at atmospheric pressure; the solid, spheroidal, spray-dried product also having the following characteristics:

particle form: spherical with a size of from 1 to 100 microns.

Apparent density of the particles: from 0.1 to 1 g/ml;

alcoholic hydroxyl group content: from 1.5 to 20% by weight;

surface area: from 10 to 100 m$^2$/g;

porosity from 1.2 to 3.5 ml/g;

pore radius: from 1,000 to 65,000 Angstroms.

7 Claims, No Drawings

METHOD OF PREPARING LOW-DENSITY ETHYLENE COPOLYMERS

The present invention relates to a method of preparing copolymers from ethylene and $C_4$ to $C_8$ alpha-olefins by suspension polymerization in the presence of a supported Ziegler-type catalyst, to give polymers with densities less than or equal to 0.942 g/ml.

The invention also relates to the supported catalyst which is active in this polymerization reaction.

Low-density ethylene copolymers are known in the art and are obtained by copolymerizing ethylene with an alpha-olefin such as 1-butene, the reaction being carried out at low pressure in the presence of Ziegler-type catalysts, by suspension polymerization. The quantity of alpha-olefin copolymerized with the ethylene in these copolymers generally varies from about 2.5 to 9 percent by weight.

In these copolymerization reactions, difficulties are encountered as a result of the relatively poor reactivity of the alpha-olefin in the copolymerization with ethylene. Hence it is usual to employ ratios of the alpha-olefin to the ethylene in the feed to the polymerization reaction which are much higher than those in the copolymer produced. This, however, favours the formation of the alpha-olefin homopolymer, which increases the quantity of wax dissolved in the liquid reaction medium. This results in an increase in the viscosity of the polymerization medium with consequent difficulties in treating the suspensions and in separating the copolymer from the suspension itself. Under these conditions it has also been noted that the polymerization catalyst becomes deactivated to a greater or lesser extent.

Attempts have been made in the art to remedy these disadvantages, especially by carrying out the reaction in a severalstage process which provides for initial homopolymerization of the ethylene followed by copolymerization of the ethylene with the alpha-olefin in the presence of the said ethylene homopolymer, as described for example in U.K. Pat. Nos. 1,526,603 and 1,532,332.

This method does not, however give a satisfactory solution to the problems mentioned above and introduces further operative complications.

According to the present invention it has been found that the reactivity of the alpha-olefin in the copolymerization with ethylene depends on the characteristics of the supported Ziegler catalyst used for the purpose, and especially on the characteristics of the support and particularly the porosity and radius of the pores of the support itself. More precisely, it has been found that alpha-olefins are more reactive in the copolymerization with ethylene the greater the porosity and the pore radius of the support within a certain range of these characteristics. This being take into account, it is possible to produce copolymers of ethylene with alpha-olefins with the desired alpha-olefin content and hence with the desired density, the reaction being carried out with low ratios of the alpha-olefin to the ethylene in the feed. The formation of homopolymers of the alpha-olefin is thus greatly reduced and consequently the soluble-wax content in the liquid polymerization medium is greatly reduced. All this is achieved with a polymerization reaction which can be carried out within an industrially-useful temperature range. It is also found that the catalyst of the present invention remains highly active whereby it is possible to produce copolymers with an ash content which is sufficiently low not to necessitate the usual purification treatment. Furthermore the copolymers contain the alpha-olefin statistically distributed in the polymeric chain (random distribution) so as to give the minimum density for a given alpha-olefin content.

Accordingly, in the present invention, copolymers of ethylene and $C_4$ to $C_8$ alpha-olefins are prepared with densities of from 0.915 to 0.942 g/ml by suspension polymerization, at a temperature of from 50° C. to 70° C., at a pressure of less than about 10 bar, in the presence of a supported Ziegler catalyst constituted by:

(a) an alkylaluminium or alkylaluminium halide;
(b) the product of the reaction of a halogenated derivative of titanium with a support material; the support material being the solid, spheroidal product of the spray drying of a solution of magnesium chloride in ethanol containing, in addition, at least one compound selected from the following classes:

aliphatic, cycloaliphatic or aromatic liquid hydrocarbons with a boiling point higher than that of ethanol at atmospheric pressure;

polar, organic hydroxy or ester compounds which are solid or liquid with a boiling point higher than that of ethanol at atmospheric pressure; the solid, spheroidal product of the spray drying further having the following characteristics:

particle form: spherical with a size of from 1 to 100 microns;

apparent density of the particles: from 0.1 to 1 g/ml;

alcoholic hydroxyl group content: from 1.5 to 20% by weight;

surface area: from 10 to 100 $m^2$/mg;

porosity from 1.2 to 3.5 ml/g;

pore radius: from 1,000 to 65,000 Angstroms.

The preparation of the support for the catalyst of the present invention medium carried out in the following manner.

Anhydrous magnesium chloride or magnesium chloride with a low water content (less than about 7 percent by weight) is used. Commercial magnesium chloride with a water content of less than about 2 percent by weight is useful for the purpose.

A solution of the magnesium chloride in ethanol is then prepared with a concentration equal to or less than that of saturation at the working temperature. The ethanol used is anhydrous or its water content is kept at less than about 5 percent by weight.

To the solution obtained is added at least one additional compound chosen from:

liquid aromatic, cycloaliphatic or aliphatic hydrocarbons with a boiling point higher than that of ethanol at atmospheric pressure, such as for example heptane, octane, nonane, decane, benzene and cyclohexane;

polar, organic hydroxy or ester compounds which are solid or liquid with a boiling point higher than that of ethanol at atmospheric pressure, such as propyl alcohol, polyvinyl alcohol, polyvinyl acetate, polyethylene glycol, butylhydroxytoluene, hydroxymethyl cellulose, tetraethyl silicate, methyl cellulose and phenols, particularly with substituents in the nucleus.

The quantity of additional compound is such that the weight ratio of the ethanol to the additional compound varies from 0.5/1 to 50/1.

It is also possible to dissolve the magnesium chloride in a mixture of ethanol and the additional compound. This treatment gives a solution (when the components are miscible) or an emulsion (when they are immiscible or partially miscible) which is spray dried according to the process of the present invention. As is known, spray drying is a technique by means of which a solution of a solute in a vaporizable solvent, or mixture of vaporizable solvents, is sprayed in the form of liquid droplets which are brought into contact with a hot, inert gas (unreactive) flowing in the same direction or in counterflow, so as to evaporate the solvent or mixture of solvents and cause the separation of the solute in the form of solid particles of generally uniform, spherical form.

In the spray drying of the solutions or emulsions acoording to the present invention, the operative conditions (such as the temperature of the gas at the inlet and at the outlet and the rates of flow of the gas and of the suspension or solution) are regulated so that a solid is recovered with a residual alcoholic hydroxyl group content of at least 1.5 percent by weight and up to a maximum of 20 percent by weight. During this treatment the additional compound is volatilized to a greater or lesser extent according to its nature. It should however be noted that the presence of the additional compound is essential if a catalyst support is to be obtained with porosity and pre diameter values within the ranges indicated above.

In the open to public inspection Italian Application No.21881 A/81, a method for preparing a supported catalyst which is active in the polymerization of gaseous ethylene is disclosed. In the said application ethanolic solution of magnesium chloride possibly containing solvents having a boiling point lower than that of ethanol are used.

When ethanolic solutions of magnesium chloride are spray dried even if they contain an added solvent but with a boiling point below that of ethanol, supports are obtained with low values of the porosity and of the pore diameter and which are inadequate or not very suitable as catalysts for the copolymerization of ethylene with alpha-olefins.

It is not possible to predetermine all the parameters for the spray drying of the solutions or suspensions according to the present invention in that, other conditions being equal, they depend on the manner in which the gas and the solution of suspension are brought into contact, on the geometry of the apparatus, its efficiency and other matters. Indicative values may however be derived from the following embodiment:

magnesium chloride is added to a mixture of ethanol and heptane (1:1 by weight) and the mixture is heated under pressure in nitrogen or another inert gas until from 100 to 1000 g of magnesium chloride have dissolved for each kg of ethanol used and the mixture is agitated strongly to form a uniform emulsion;

the emulsion is sprayed through a nozzle, or other equivalent device, into an evaporation chamber of a spray drier and the liquid droplets thus obtained are brought into contact with a flow of gaseous nitrogen, of high purity (water content less than 5 ppm) fed into the evaporation chamber;

moreover the process is carried out with a temperature of the gaseous flow at the inlet of the order of 250° to 400° C. and at the outlet of 140°–250° C. and with a temperature difference between the inlet and the outlet of at least 50° C. degrees.

With this range of conditions, a solid separates which constitutes the support for the catalyst, the characteristics of which fall typically within the following ranges of values:

particle form: spherical with a size of from 1 to 100 microns, 90 percent or more of the particles having differences in dimensions of within 20 microns;

apparent density of the particles from 0.1 to 1 ml/g alcoholic hydroxyl group content: from 1.5 to 20 percent by weight;

surface area from 10 to 100 m$^2$/g;

porosity of from 1.2 to 3.5 ml/g;

pre radius: from 1,000 to 65,000 Angstroms.

To prepare the component (b) of the catalyst of the present invention, the support, prepared as outlined above, is brought into contact with a halongenated compound of titanium under reaction conditions, and is reacted therewith.

Among the halogenated compounds of titanium, those particularly useful are the halides, oxyhalides, alkoxyhalides and the halogeno-alcoholates. Specific examples are: $TiCl_4$, $TiBr_4$, $Ti(OC_2H_5)_3Cl$ and $TiCl_4$. For contact with the support, the halogenated titanium compounds may be in liquid form or in solution in solvents such as pentane, hexane, heptane and the like. In the case of $TiCl_4$, times of from 2 to 120 minutes are generally required at temperatures from ambient (20° to 25° C.) up to 136° C., to fix the titanium to the support. In general the titanium is present in the component (b) of the catalyst in quantities of from 0.7 to 12 percent by weight, preferably from 1 to 7.5 percent by weight.

It has been found experimentally that the surface area of the support is increased considerably by the treatment with the halogenated titanium compound while the porosity is not substantially changed or undergoes a slight decrease according to the nature of the additional compound used, in the composition subjected to spray drying. The component (a) of the catalyst of the present invention is constituted by an alkylaluminium or alkylaluminium halide. The best results are obtained with trialkylaluminium compounds, especially those containing from 2 to 4 carbon atoms in the alkyl radical. Specific examples are $Al(C_2H_5)_3$, $Al(iso-C_4H_9)_3$ and $Al(C_2H_5)_2Cl$.

The catalyst of the present invention is active in the copolymerization of ethylene with $C_4$ to $C_8$ alpha-olefins that is 1-butene, 1-pentene, 1-hexene, 1-heptene and 1-octene.

In these polymerization reactions, the relative proportions of the components (a) and (b) of the catalyst may be varied within wide limits, the aluminium/titanium atomic ratio generally being greater than 2.5/1 and up to values of the order of 5000/1.

The polymerization is carried out in suspension in an inert, (unreactive) organic liquid medium such as hexane, cyclohexane and heptane.

The polymerization temperatures may vary from 50° C. to 70° C., preferably 55° C. to 70° C. The pressures are generally less than about 10 bar. The molecular weight of the copolymer can be regulated by means of a chain terminator such as hydrogen.

In the copolymerization of ethylene with alpha-olefins the catalysts of the present invention enable such high values of the activity and productivity to be achieved as to render the separation of catalytic residues from the copolymer itself superfluous. Moreover the regular spherical form of the component (b) of the catalyst allows the copolymers under discussion to be obtained in the form of regular, spherical granules which are free flowing and have densities such as to make them usable directly in the workings to which they are usually subjected.

The method of the present invention is particularly useful for producing polymers of ethylene and 1-butene containing 2.5 to 9 percent by weight of 1-butene in the copolymer. In this polymerization, ethylene and 1-butene are typically fed to the polymerization medium and a concentration of 1-butene of from 5 to 25 percent by weight is maintained constantly in the liquid polymerization phase.

The reaction being carried out within the range of the other conditions indicated, copolymers of ethylene and 1-butene are obtained with densities of from 0.915 to 0.942 and with values of the melt-index of from 0.7 to 4. The quantity of wax produced is typically of the order of 3–24 parts by weight for every 100 parts by weight of the sum of the copolymer and of the wax.

The experimental examples which follow are illustrative and non-limiting of the invention.

EXAMPLE 1

Commercial magnesium chloride flakes with a water content of 2% by weight and dimensions of from 0.1 to 2 mm are used in the preparation of the support for the catalyst.

25 g of the magnesium chloride are added to a mixture of 160 g of ethanol and 160 g of decane (commercial product LIMESOL M of SHELL CHEM. previously dehydrated over 3 A molecular sieves. The mixture is heated under agitation and under pressure in nitrogen until all the magnesium chloride crystals have disappeared and an emulsion has been formed which is spray dried in laboratory apparatus of the Gastaldi type, comprising a vertical chamber having a two-fluid pneumatic-type nozzle at the top for the introduction of the emulsion and the gaseous flow and means for discharging the gaseous flow and a cyclone for collecting the solid particles at the bottom.

The process is carried out with an inlet temperature of the nitrogen flow of 350° C. and an outlet temperature of the gaseous flow of 230° C., the nitrogen being supplied at a rate of 8 m$^3$ (evaluated under normal conditions) per 400 ml of emulsion to be treated.

A granular solid is collected at the bottom of the chamber and has the following characteristics:
  particle form: spherical with about 90 percent of the particles between 5 and 10 microns;
  apparent density of the particles: 0.2 g/ml:
  alcoholic hydroxyl group content: 10 percent by weight evaluated as ethanol;
  surface area: 30 m$^2$/g;
  porosity: 2.4 ml/g;
  pore radius: from 1000 to 30000 Angstroms.

This particulate solid is used as the support for the preparation of the component (b) of the catalyst.

5 g of the support prepared as described above are placed in 100 g of anhydrous decane known commercially as LIMESOL M, of SHELL CHEM. containing 5 ml of TiCl$_4$.

This is heated for two hours at 115°. At the end of this treatment it is cooled, the solid is filtered and washed with the paraffin indicated above until the chloride ions have disappeared.

The component (b) of the catalyst thus obtained has the following characteristics:
  form and dimensions of particles: similar to those of the support;
  titanium content (as the metal): 3.6 percent by weight;
  surface area: 100 m$^2$/g;
  porosity: 2 ml/g.

17 mg of the component (b) of the catalyst are mixed with the component (a) triethylaluminium (0.2 ml) in 2 liters of anhydrous hexane. The catalytic suspension thus obtained is placed in a stainless steel polymerization reactor having a stirrer (speed of the stirrer 700 rpm) and an oil system for regulating the temperature.

To the reactor is fed a mixture of ethylene and 1-butene (6 bar) and hydrogen (2 bar) and the polymerization is carried out at 62° C., with the 1-butene dissolved in the liquid phase in a quantity maintained at about 18% by weight, further quantities of reagents being added as the reaction proceeds to make up for those consumed. After one hour, the polymerization is stopped and the copolymer of ethylene and 1-butene is recovered and has the following characteristics:
  1-butene content: 7 percent by weight;
  melt index: 1 g/10' (ASTM D 1238)
  density: 0.922 g/ml (DIN53479)
  physical form of the copolymer: granules, 90% of which have a size of from 125 to 250 microns
  titanium content (as the metal): 2 ppm.
The following values are also noted:
  productivity: 18 kg of copolymer per gram of catalyst;
  activity: 83,330 g of copolymer per g of titanium, per hour and per atmosphere of 1-butene and ethylene mixture.

The soluble-wax content of the reaction medium is 20 parts by weight per 100 parts by weight of the sum of the ethylene/1-butene copolymer and the wax.

EXAMPLE 2

(Comparison)

The preparation of the support for the catalyst was carried out as in Example 1, the paraffin LIMESOL M of SHELL CHEM. being omitted from the composition subjected to spray drying.

A support was obtained having the following characteristics: particle form: spherical with 20 percent of the particles between 5 and 10 microns;
  apparent density of the particles: 0.35 g/ml;
  alcoholic hydroxyl group content: 9.5 percent by weight evaluated as ethanol;
  surface area: 3 m$^2$/g;
  porosity: 0.7 ml/g;
  pore radius: from 100 to 10,000 Angstroms.

5 g of the support were treated with TiCl$_4$ in the manner outlined in Example 1 and the component (b) of the catalyst was obtained with the following characteristics:
  form and dimensions of the particles: similar to those of the support;
  titanium content (as metal): 2 percent by weight;
  surface area: 60 m$^2$/g;
  porosity: 0.7 ml/g.

The component (b) of the catalyst was used in the copolymerization of ethylene with 1-butene in the same manner as in Example 1 and a copolymer was obtained with the following characteristics:
  1-butene content: 4.5 percent by weight;
  melt index: 0.8 g/10';
  density: 0.930 g/ml
  titanium content (as the metal): 4 ppm The values noted for the productivity and the activity respectively were 6.7 and 41,660. The wax content was 24 % by weight. All the characteristics are expressed in the units indicated in Example 1.

EXAMPLE 3

33 kg of MgCl$_2$ were dispersed in 100 liters of heptane and the suspension was added to 55 kg of ethanol, the mass being kept under agitation in a steel autoclave. The mixture was heated under agitation to 130° C. under pressure in nitrogen. A uniform emulsion was obtained which was fed at that temperature into the industrial spray drying apparatus CLOSE CYCLE DRIER made by NIRO.

In this apparatus the emulsion was reduced to liquid droplets with the use of a hydraulic nozzle with an aperture of 0.7 mm and a spray cone angle of 60°. The supply pressure was 7 kg/cm$^2$ and the flow rate was 15 liters of emulsion per hour.

The apparatus was operated with a temperature of the nitrogen at the inlet of 250° C. and of the gaseous flow at the outlet of 160° C.; with a nitrogen flow of about 200 m$^3$/hour evaluated under normal conditions. At the bottom of the reactor a granular solid was recovered with the following characteristics:
- particle form: spherical with 80 percent of the particles within the range 30 to 40 microns;
- apparent density of the particles: 0.28 g/ml;
- alcoholic hydroxyl group content: 25 percent by weight expressed as ethanol;
- surface area: 32 m$^2$/g;
- porosity: 3 ml/g;
- pore radius: from 1,000 to 65,000 Angstroms 5 g of the support were treated with TiCl$_4$ as outlined in Example 1 and the component (b) of the catalyst was obtained with the following characteristics:
- form and dimensions of the particles: similar to those of the support;
- titanium content (as the metal): 2.4 percent by weight;
- surface area: 120 m$^2$/g;
- porosity: 2.8 ml/g.

Ethylene was copolymerized with 1-butene with 20 mg of the component (b), 0.2 ml of triethylaluminium, 16 percent by weight of 1-butene dissolved in the liquid phase, and with the other conditions described in Example 1.

The copolymer obtained had the following characteristics:
- 1-butene content: 8.5 percent by weight;
- melt index: 1 g/10'
- density: 0.918 g/ml;
- titanium content (as the metal): 2 ppm.

The values of the activity and productivity were also noted and were 12 and 93,330 respectively, evaluated in the usual manner. There was 18 percent by weight of waxes evaluated in the usual manner.

EXAMPLES 4 TO 19

100 kg of anhydrous magnesium chloride flakes and 100 kg of anhydrous ethanol were loaded into the autoclave of Example 3. To this mixture was added the additional compound indicated in Table 1. This table also gives the weight ratio of the ethanol to the additional component (EtOH/add.comp.). The mixture was heated under pressure in nitrogen to 145° C.-150° C. and spray dried in the apparatus described in Example 3.

Table 1 gives the temperatures of the nitrogen at the inlet (Ti) and of the gaseous flow at the outlet (Tu) expressed in °C.

The support for the catalyst was collected at the bottom of the drier and Table 1 gives the values of the average diameter of the particles expressed in microns (diameter), the porosity expressed in ml/g (porosity), the surface area expressed in m$^2$/g (area) and the alcoholic hydroxyl group content expressed as a percentage by weight of ethanol (OH groups).

The supports thus obtained were treated individually for one hour at 130° C. in suspension in anhydrous liquid paraffin (LIMESOL M of SHELL CHEM.) with a TiCl$_4$/support weight ratio of 5.

At the end of this treatment the solid was filtered and washed with the paraffin LIMESOL M of SHELL CHEM. until the chloride ions had disappeared. Thus the component (b) of the catalyst was obtained with the characteristics given in Table 2. More particularly, this table gives the values of the titanium content (as the metal) expressed as a percentage by weight (% Ti), the pore volume expressed in ml/g porosity and of the surface area expressed in m$^2$/g (area).

The component (b) of the catalyst thus obtained was used in the tests for the copolymerization of ethylene with 1-butene. More particularly, in these tests 10 mg of the component (b) and 0.2 ml of triethylaluminium were used and the reaction was carried out at 55° C., in heptane as the solvent (2 liters) at a pressure of 6 bars of ethylene plus 1-butene and 2 bars of hydrogen with a quantity of dissolved 1-butene of about 10 percent by weight in the liquid polymerization medium.

The duration of the tests, as in Example 1, was one hour during which additions were made to compensate for the reagents converted.

Table 3 gives the characteristics of the copolymer obtained and, more particularly, the values of the melt index in g/10' according to ASTM D 1238 (MI), the density in g/ml according to DIN53479 (density), the average diameter of the spherical particles of the polymer expressed in microns (diameter) and the productivity expressed in kg of copolymer per g of catalyst (productivity).

The quantity of wax in these tests varied from 4 to 20 parts by weight for every 100 parts by weight of the sum of the wax and of the ethylene/1-butene copolymer.

EXAMPLE 20

This was carried out in a similar manner to Example 5, 4 mg of the component (b) and 0.2 ml of diethyl aluminium being used for the polymerization. 150 ml of 1-octene were added to the polymerization medium.

Ethylene and hydrogen were then fed in and the reaction was carried out for one hour at 70° C. at a total pressure of 8 bar (2 bars of hydrogen).

An ethylene / 1-octene copolymer was obtained in spheroidal form with an average size of the granules of 1800 microns, with a density of 0.936, a melt index of 0.8 and a titanium content of 1 ppm.

TABLE 1

| Ex. | Additional Compound(s) | EtOH/ add. comp. | Ti | Tu | Diameter | porosity | area | OH groups |
|---|---|---|---|---|---|---|---|---|
| 4 | cyclohexane | 1 | 280 | 150 | 50 | 1.6 | 30 | 25 |
| 5 | heptane | 1.5 | 300 | 165 | 50 | 2 | 40 | 18.6 |

TABLE 1-continued

| Ex. | Additional Compound(s) | EtOH/ add. comp. | Ti | Tu | Diameter | porosity | area | OH groups |
|---|---|---|---|---|---|---|---|---|
| 6 | heptane | 1 | 260 | 180 | 50 | 2.95 | 12 | 21 |
| 7 | heptane | 1 | 280 | 210 | 40 | 2.3 | 27 | 12.6 |
| 8 | LIMESOL M | 2 | 340 | 225 | 54 | 1.4 | 22 | 8.9 |
| 9 | LIMESOL M | 0.5 | 340 | 225 | 40 | 2.6 | 12 | 13.3 |
| 10 | LIMESOL M | 1 | 340 | 225 | 50 | 1.72 | 24 | 9.8 |
| 11 | polyvinyl alcohol (m.w. 20,000) | 20 | 400 | 220 | 40 | 1.4 | 17.2 | 10 |
| 12 | butylhydroxy toluene | 1 | 310 | 145 | 50 | 2.2 | 33 | 26 |
| 13 | polyethylene glycol (melt pt. 50° C.) | 20 | 400 | 250 | 50 | 1.2 | 40 | 5 |
| 14 | propyl alcohol | 1 | 280 | 160 | 50 | 1.7 | 24 | 20 |
| 15 | dimethyl glyoxime | 30 | 350 | 200 | 50 | 1.2 | 14 | 14 |
| 16 | Tetraethyl silicate | 7 | 300 | 150 | 50 | 1.8 | 24 | 17 |
| 17 | Polyvinyl acetate | 20 | 380 | 210 | 50 | 1.4 | 14 | 9 |
| 18 | hydroxyethyl cellulose | 10 | 260 | 180 | 50 | 1.8 | 12 | 18 |
| 19 | Methyl cellulose | 10 | 260 | 180 | 50 | 1.6 | 12 | 18 |

TABLE 2

| Example | % Ti | porosity | Area |
|---|---|---|---|
| 4 | 6 | 1.54 | 120 |
| 5 | 4.95 | 1.8 | 152 |
| 6 | 5 | 2.8 | 69 |
| 7 | 3.0 | 1.8 | 120 |
| 8 | 2.2 | 1.4 | 81 |
| 9 | 3.6 | 2.58 | 72 |
| 10 | 2.5 | 1.7 | 80 |
| 11 | 2.95 | 1.4 | 55 |
| 12 | 6.3 | 2.2 | 105 |
| 13 | 1.4 | 1.2 | 80 |
| 14 | 5.1 | 1.6 | 83 |
| 15 | 2.8 | 1.2 | 30 |
| 16 | 4.3 | 2.0 | 125 |
| 17 | 3.2 | 1.8 | 48 |
| 18 | 5.5 | 1.8 | 47 |
| 19 | 5.5 | 1.6 | 40 |

TABLE 3

| Example | MI | Density | Diameter | Productivity |
|---|---|---|---|---|
| 4 | 1 | 0.938 | 1.100 | 13 |
| 5 | 0.8 | 0.932 | 1.500 | 35 |
| 6 | 0.9 | 0.9273 | 1.250 | 16.6 |
| 7 | 1 | 0.9240 | 1.000 | 20 |
| 8 | 0.8 | 0.9405 | 920 | 8 |
| 9 | 1 | 0.930 | 1.000 | 20 |
| 10 | 0.9 | 0.934 | 1.200 | 15 |
| 11 | 1.8 | 0.941 | 950 | 16 |
| 12 | 2 | 0.9285 | 1.650 | 36 |
| 13 | 1 | 0.942 | 900 | 8 |
| 14 | 1 | 0.939 | 1.200 | 13 |
| 15 | 2 | 0.942 | 850 | 8 |
| 16 | 1 | 0.929 | 1.200 | 12 |
| 17 | 1 | 0.938 | 1.250 | 17 |
| 18 | 1.4 | 0.940 | 1.100 | 9 |
| 19 | 1.4 | 0.940 | 1.000 | 9 |

What is claimed is:

1. Method for preparing copolymers of ethylene and alpha-olefins, with densities of from 0.915 to 0.942 g/ml characterized by polymerizing ethylene and an alpha-olefin having from 4 to 8 carbon atoms in an inert (unreactive) organic liquid medium at a temperature of from 50° to 70° C. and at a pressure less than 10 bars, while maintaining a concentration of from 5 to 25% by wt. of the said alpha-olefin in the said medium during the reaction, in the presence of a Ziegler supported catalyst consisting of a compound selected from alkylaluminums and alkylaluminum halides and the product of the reaction of a halogenated derivative of titanium with the solid spheroidal product of the spray drying of a solution of magnesium chloride in ethanol containing at least one additional compound with a boiling point higher than that of ethanol at atmospheric pressure selected from the group consisting of aliphatic, cycloaliphatic or aromatic liquid hydrocarbons or polar organic hydroxy compounds, said solid, spheroidal product of the spray drying having a residual alcoholic hydroxyl group content of from 1.5% to 20% by wt., a surface area of from 10 to 100 m$^2$/g and a porosity of from 1.2 to 3.5 ml/g with a pore radius of from 1,000 to 65,000 Angstroms.

2. Method as claimed in claim 1, wherein said additional compound is heptane, octane, nonane, decane, benzene or cyclohexane.

3. Method as claimed in claim 1, wherein said additional compound is propyl alcohol, polyvinyl alcohol, polyethylene glycol, butylhydroxytoluene, hydroxymethyl cellulose, dimethylglyoxime, methylcellulose or phenols including phenols with substituents in the nucleus.

4. Method as claimed in claim 1, wherein the weight ratio of said ethanol to said additional compound is in the range 0.5/1 to 50/1.

5. Method as claimed in claim 1, wherein said halogenated derivative of titanium is selected from the halides, oxyhalides and alkoxyhalides of titanium.

6. Method as claimed in claim 5, wherein said halogenated derivative of titanium is TiCl$_4$.

7. Method as claimed in claim 1, wherein said halogenated derivative of titanium is selected from the halogeno-alcoholates of titanium.

* * * * *